May 25, 1954  D. B. NICHINSON  2,679,167
ANTIBACKLASH DEVICE
Filed Dec. 4, 1951
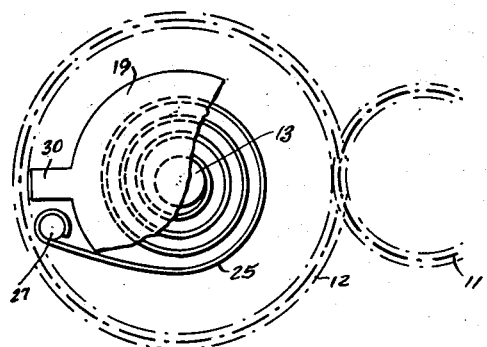
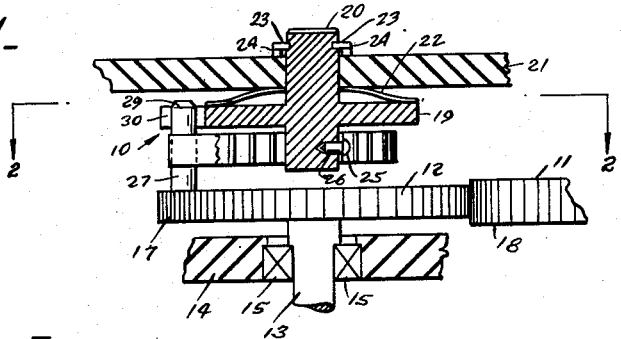
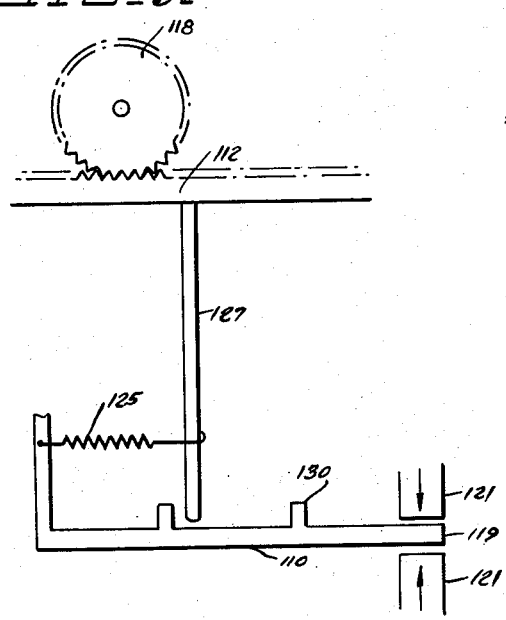
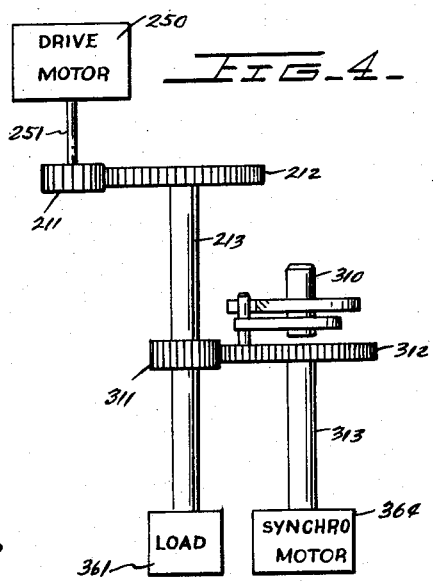
INVENTOR.
DAVID B. NICHINSON
BY
Ostrolenk & Faber
ATTORNEYS Patented May 25, 1954

2,679,167

UNITED STATES PATENT OFFICE 2,679,167

ANTIBACKLASH DEVICE

David B. Nichinson, New York, N. Y., assignor to Kollsman Instrument Corporation, Elmhurst, N. Y., a corporation of New York Application December 4, 1951, Serial No. 259,765

4 Claims. (Cl. 74—409)

My present invention relates to an improvement in gear systems, and more particularly to an anti-backlash device that is utilized in gear systems having resilient and frictional members.

Backlash exists in gearing where there is a looseness or play in gears such that one gear may be rotated an amount in the reverse direction without causing motion of other meshing gears.

Heretofore in the prior instrument art, the presence of backlash has been detrimental to the accuracy of indicating instruments. The elimination of backlash has become of even greater importance in insuring proper performance of automatic control systems.

Reduction of backlash by the use of a braking force on the driven member has long been known. Reduction of backlash by the use of a restraining spring on a driven member has also been known in the case of driven members having only limited movement over an arc of less than a few turns.

However, in instruments where the dial pointer turns through greater revolutions, the prevention of backlash has been difficult except by the use of anti-backlash gears at every significant gear-mesh.

The present invention overcomes this difficulty and eliminates backlash in the gear train by providing a spring member which keeps the driven gear firmly in position against the driving gear and a friction member which acts as a brake allowing the spring to be resiliently deformed even when the indicator is turned through a plurality of revolutions.

After the spring is wound tight, additional revolution in the same direction will result in rotating the coiled spring as a body against the friction of a slipping brake. This is accomplished by securing the base of the spring to a rotatable frictionally stabilized assembly.

It is then an important object of the present invention to provide an anti-backlash device which is operable over a plurality of rotations.

Still another important object of the present invention is the provision of an anti-backlash device of simple and economical construction as may be utilized in an aircraft instrument.

Still another important object of the present invention is the provision of a slipping clutch that maintains a coiled spring in resilient deformation over a plurality of rotations thereof.

Further objects and advantages of the present invention will become evident upon consideration of the figures and description wherein:

Figure 1 is a cross-sectional view of the present invention.

Figure 2 is a partial cross-sectional view along line 2—2 in Figure 1 of the present invention.

Figure 3 is a schematic drawing illustrating the principles of the present invention.

Figure 4 is a side view of the present invention included in a typical mechanical system.

Referring now to Figures 1 and 2, the anti-backlash device 10 is shown associated with driving pinion 11 and the gear 12. The gear 12 is borne on a shaft 13 which is mounted on a panel 14 by means of bearing 15. The teeth 17 of the gear 12 are shown schematically, and are firmly pressed against the sides of the teeth 18, also shown schematically, of the pinion 11 by means of the anti-backlash device 10.

The anti-backlash device 10 has a plate 19 and a shaft 20. The shaft 20 is mounted on panel 21 and as shown may be of a single molded unit with the plate 19.

Plate 19 has rigidly attached thereto a spring metal disc 22 which is rotatably supported on shaft 20 between plate 19 and panel 21. The disc 22 is then in frictional engagement with panel 21 and acts as a clutch as is hereinafter described.

Shaft 20 and hence plate 19 are maintained against longitudinal displacement by a collar 24 secured to the upper surface of panel 21 and engaged in an annular groove 23 of shaft 20. Shaft 20 may be transversely split at the groove 23 with the parts of the shaft in threaded engagement or collar 24 may be split to permit easy assembly.

The other end of the shaft 20 has firmly affixed thereto a spring 25 by means of a pin 26. The spring 25 is a coiled spring, and is shown more particularly in Figure 2. The other end of the spring 25 is fixed to a pin 27 which is attached to the driven gear 12 described above. The end 29 of the pin 27 projects into the plane of plate 19 and acts as an abutment to arm 30 of the plate 19.

As the pinion 11 drives the gear 12, the pin 27 is rotated with the gear 12, deforming the spring 25.

The plate 19 remains stationary under this initial deformation. When, however, the gear 12 has rotated through a predetermined angle which is usually less than one revolution, the extension 29 of the pin 27 meets the arm 30 of the plate 19, and causes the plate 19 to rotate. The rotation of the plate 19 occurs due to the clutch action of the disc 22 which is in frictional engagement with panel 21. The spring 25 is thus continuously deformed in a regular manner upon a plurality of rotations of the gear 12.

The anti-backlash device 10 is shown schematically in the schematic drawing of Figure 3 which is here presented solely to provide a simplified means of illustrating the principles of operation. The pinion 118 meshes with the gear 112 which are essentially similar to the pinion 18 and gear 12 described above. Attached to the gear 112 is a pin 127, to which is attached one end of the spring 125. The other end of the spring 125 is connected to the anti-backlash member 110. The spring 125 is resiliently deformed upon the movement of the pin 127 when the gear 112 moves. When the pin 127 reaches a protrusion 130 of the anti-backlash member 110, the entire anti-backlash member 110 moves with the further movement of the pin 127. With the spring 125 being continuously deformed, the anti-backlash device 110 does not move before the pin 127 meets the protrusion 130 due to the frictional relationship between the end 119 of the member 110 and its bearing walls 121.

The brake principle is thus presented in a different modification providing an anti-backlash device operable over a plurality of revolutions avoiding backlash in both directions.

The anti-backlash device of the present invention is shown in a typical mechanical system in Figure 4. The driving motor 250 carries on its shaft 251 a pinion 211. The pinion 211 meshes with the gear 212.

Mounted on the shaft 213 of the gear 212 is the pinion 311 and a load 361. The pinion 311 drives another gear 312. Thus driven gear 312 and the associated anti-backlash device 310 are utilized to rotate a synchronous motor 364 by means of the shaft 313. The gear 312 cannot move relative to the pinion 311 and the gear 212 similarly is restrained against the pinion 211. Thus, backlash is avoided in the gearing between the motor 250, the load 361, and the motor 364 in both directions. The above system is described by means of an example to illustrate the possible utility of this anti-backlash device.

The principles of the present invention may be extended to cover other modifications and embodiments, and the clutch action may be set for any angle. The operative angle of the brake is usually desirable to be maintained at a minimum value consistent with the application. A relatively uniform torque is thus obtainable even for relatively small revolutions. Having a constant torque over the entire revolution is a particularly desirable feature in automatic control systems.

Further modification using different types of clutch arrangements are possible and other variations in the actual form of the device are also possible. Accordingly I prefer to be bound not by the specific disclosures herein but only by the appended claims.

I claim:

1. An anti-backlash device for a gear mechanism having either clockwise or counterclockwise rotation comprising a biasing means, a brake means and a plate; said gear mechanism having a driven and a driving member; said biasing means having one end secured to said driven member and having the other end thereof secured to said plate; said driven member operatively connected to said plate after a predetermined movement of said driven member; said brake means frictionally preventing movement of said plate until said predetermined movement of said driven member.

2. An anti-backlash device for a gear mechanism comprising a coil spring, a resilient disc and a plate; said gear mechanism having a driven and driving member; said coil spring secured to said plate and said driven member; said resilient disc normally preventing rotation of said disc by said coil spring; said driven member operatively connected to said plate after a predetermined movement of said driven member; said resilient disc ineffective to prevent movement of said plate when said driven means is operatively connected thereto.

3. An anti-backlash device for a gear mechanism having a driving and a driven member in which either the driving or driven member is capable of multi-revolution movement comprising a biasing means, frictional means and a rotatably mounted plate; said biasing means secured to said rotatably mounted plate and said driven means; said biasing means normally exerting a rotational force on said rotatably mounted plate; said frictional means normally preventing rotation of said rotatably mounted plate; said driven means operatively connected to said rotatably mounted plate after a predetermined movement of said driven means; said frictional means ineffective to prevent rotation of said rotatably mounted plate when said driven means is operatively connected thereto.

4. An anti-backlash device for driving and driven gears comprising a panel, a brake assembly mounted on said panel and a coil spring attached to said brake assembly; said brake assembly comprising a plate, a resilient disc, a shaft and a pin; said pin rigidly secured to one of said gears; said shaft rotatably mounted on said panel; said plate and one end of said spring rigidly secured to said shaft; said resilient disc mounted on said shaft between said plate and said panel; said spring normally biasing said shaft and said plate for rotation; said resilient disc normally preventing rotation of said shaft and said disc by said spring; said pin operatively connected to said plate after predetermined movement of said driven member; said resilient disc ineffective to prevent rotation of said disc when said pin is operatively connected thereto; said brake assembly maintaining a constant torque value for said spring.

References Cited in the file of this patent

UNITED STATES PATENTS

| Number | Name | Date |
|---|---|---|
| 1,796,992 | Helm et al. | Mar. 17, 1931 |